(12) United States Patent
Ohr et al.

(10) Patent No.: US 10,024,371 B2
(45) Date of Patent: Jul. 17, 2018

(54) WEDGE CLUTCH ASSEMBLY HAVING SEGMENTED WEDGES AND WEDGE CLUTCH ASSEMBLY HAVING AN AXIALLY DISPLACEABLE ASSEMBLY

(71) Applicant: Schaeffler Technologies AG & Co. KG, Herzogenaurach (DE)

(72) Inventors: Carsten Ohr, Charlotte, NC (US); Brian Lee, York, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 57 days.

(21) Appl. No.: 15/229,441

(22) Filed: Aug. 5, 2016

(65) Prior Publication Data
US 2018/0038423 A1 Feb. 8, 2018

(51) Int. Cl.
*F16D 41/061* (2006.01)
*F16D 41/063* (2006.01)
*F16D 13/16* (2006.01)

(52) U.S. Cl.
CPC ........... *F16D 41/061* (2013.01); *F16D 13/16* (2013.01); *F16D 41/063* (2013.01)

(58) Field of Classification Search
CPC ........... F16D 13/16; F16D 19/00; F16D 41/06
See application file for complete search history.

(56) References Cited

U.S. PATENT DOCUMENTS

| 793,920 A | * | 7/1905 | Crecelius | |
|---|---|---|---|---|
| 2,179,837 A | * | 11/1939 | Wolkoff | F16D 13/16 188/70 R |
| 7,779,979 B2 | * | 8/2010 | Youk | F16D 23/04 192/65 |
| 2014/0332335 A1 | | 11/2014 | Strong | |

FOREIGN PATENT DOCUMENTS

GB 2097491 * 4/1981

* cited by examiner

*Primary Examiner* — Mark Alan Manley
(74) *Attorney, Agent, or Firm* — Brooks Kushman P.C.

(57) ABSTRACT

A wedge clutch assembly for selectively engaging or disengaging an inner and outer hub including first and second wedge plate segments arranged radially between the inner and outer hubs, the first wedge plate including a first inner circumferential surface having an increasing radius in a first circumferential direction and the second wedge plate segment including a second inner circumferential surface having a decreasing radius in the first circumferential direction, and, third and fourth wedge plate segments arranged radially between the first and second wedge plate segments and the inner hub, the third wedge plate segment including a first outer circumferential surface in contact with the first inner circumferential surface and the fourth wedge plate segment including a second outer circumferential surface in contact with the second inner circumferential surface.

14 Claims, 19 Drawing Sheets

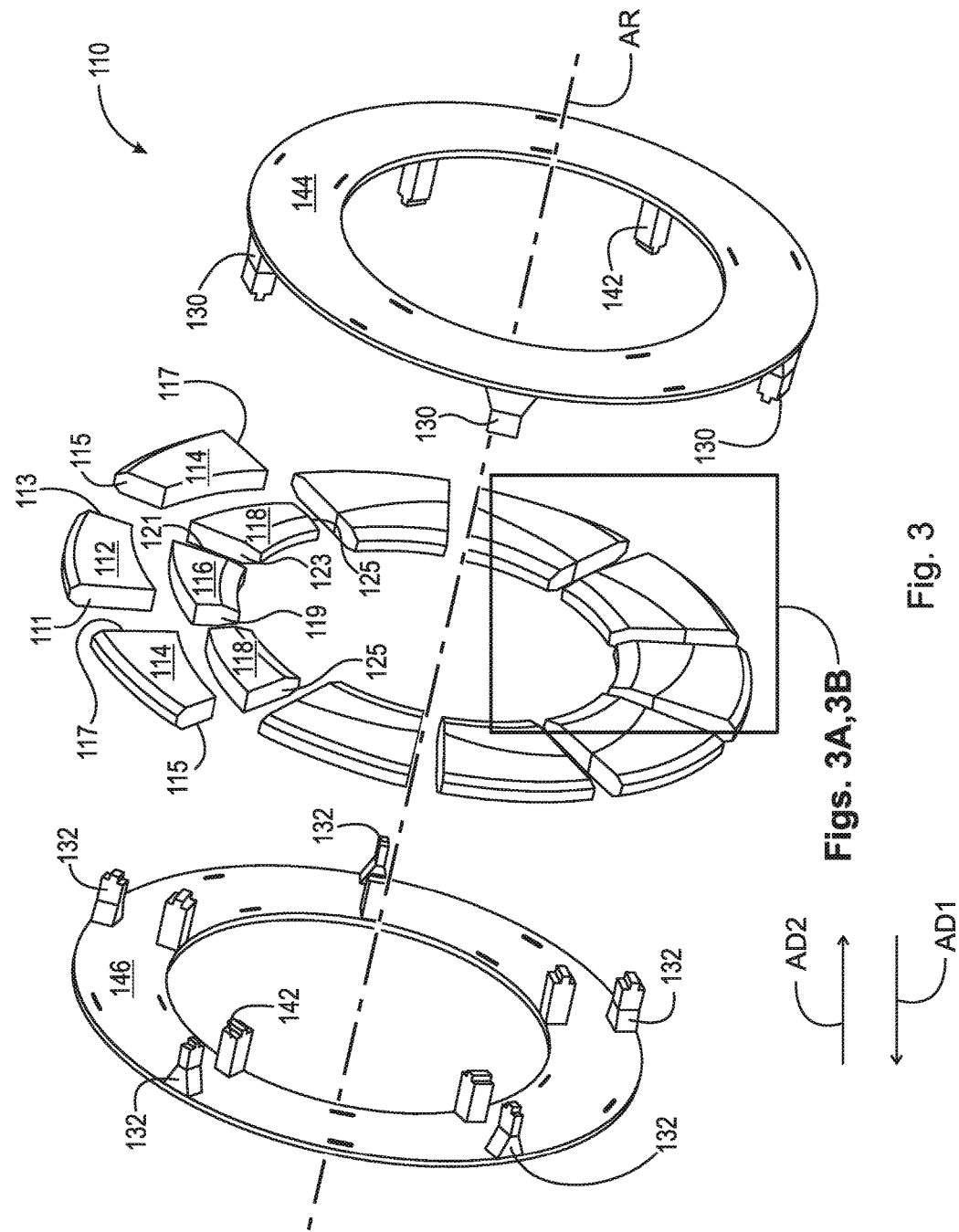

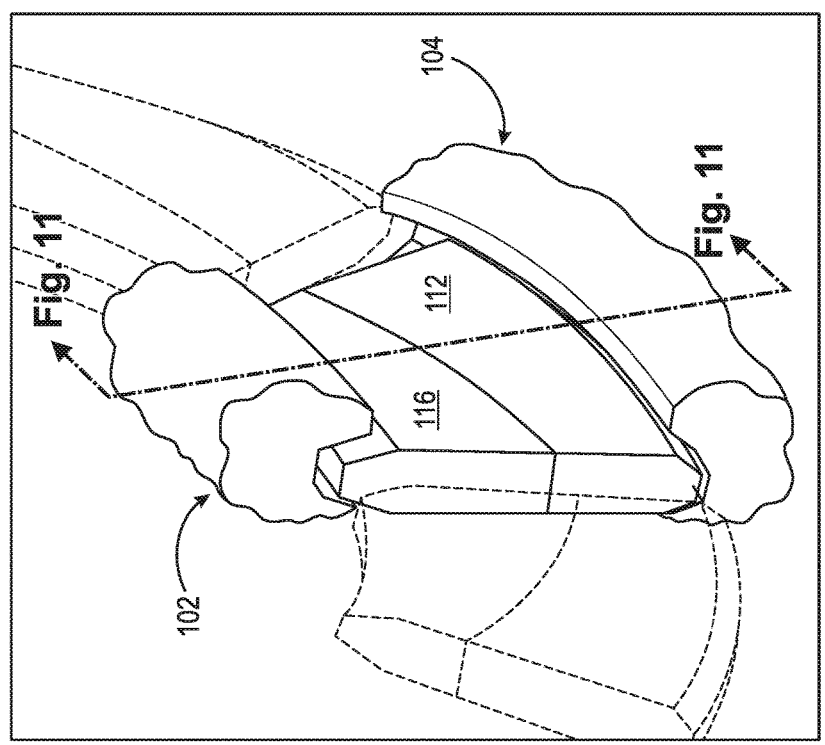

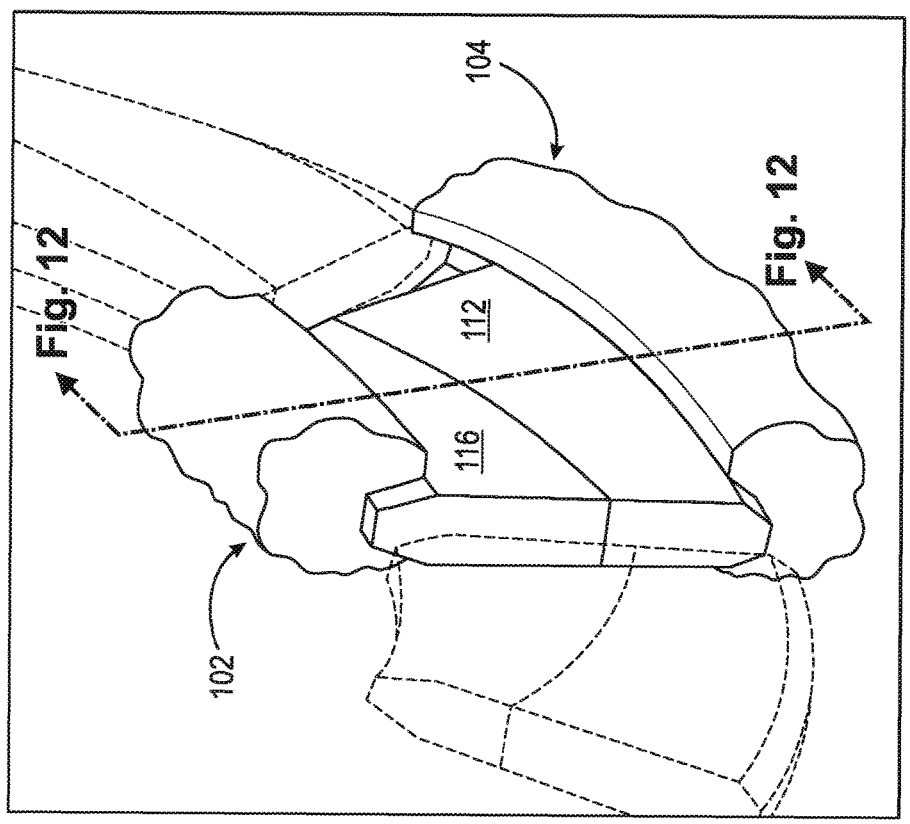

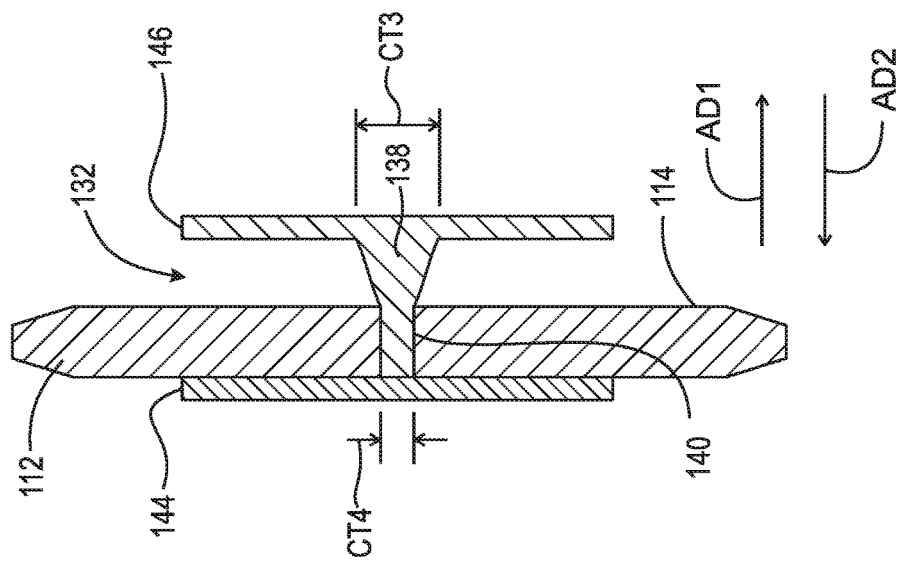
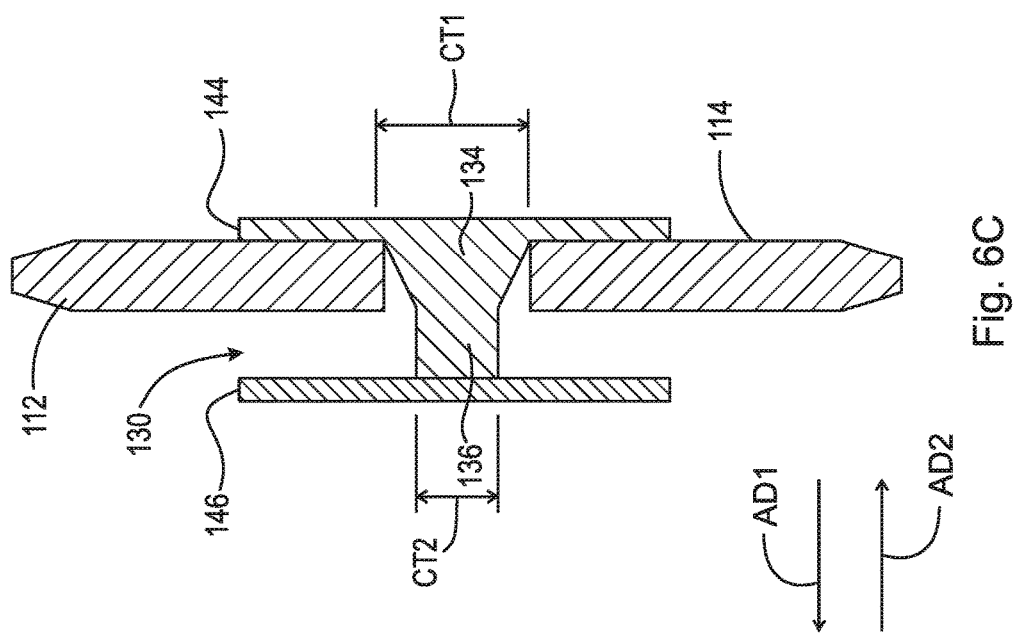

WEDGE CLUTCH ASSEMBLY HAVING SEGMENTED WEDGES AND WEDGE CLUTCH ASSEMBLY HAVING AN AXIALLY DISPLACEABLE ASSEMBLY

TECHNICAL FIELD

The present disclosure relates generally to a wedge clutch assembly, and, more specifically, to a bi-directional wedge clutch assembly that enables switching between engaged and disengaged modes. In particular, the wedge clutch assembly includes wedge plate segments having alternating ramps and an axially displaceable assembly to engage and disengage the wedge clutch.

BACKGROUND

One way wedge clutches typically transfer torque between an input component and an output component in a single circumferential direction and exhibit a free-wheel mode when they rotate in the opposite circumferential direction. It is common to maintain some frictional contact between the one way wedge clutch components even in the free-wheel mode. However, such frictional contact causes torque drag, subsequent energy dissipation and a decrease in efficiency. Bi-directional wedge clutches typically transfer torque between an input component and an output component in both circumferential directions and exhibit a free-wheel mode in both circumferential directions. Frictional contact among the components of a wedge clutch disconnect can cause unintentional locking.

SUMMARY

According to aspects illustrated herein, there is provided a wedge clutch assembly for selectively engaging or disengaging an inner and outer hub including first and second wedge plate segments arranged radially between the inner and outer hubs, the first wedge plate segment including a first inner circumferential surface having an increasing radius in a first circumferential direction and the second wedge plate segment including a second inner circumferential surface having a decreasing radius in the first circumferential direction, and, third and fourth wedge plate segments arranged radially between the first and second wedge plate segments and the inner hub, the third wedge plate segment including a first outer circumferential surface in contact with the first inner circumferential surface and the fourth wedge plate segment including a second outer circumferential surface in contact with the second inner circumferential surface.

According to aspects illustrated herein, there is provided a wedge clutch assembly for selectively engaging and disengaging an inner and outer hub including first and second wedge plate segments arranged radially between the inner and outer hubs, third and fourth wedge plate segments arranged radially between the first and second wedge plate segments and the inner hub, and an axially displaceable assembly arranged to non-rotatably connect the first, second, third, and fourth wedge plate segments with the inner and outer hubs, the axially displaceable assembly including first extension members contacting the first and second wedge plate segments and second extension members contacting the third and fourth wedge plate segments, the second extension members being different than the first extension members.

According to aspects illustrated herein, there is provided a method of actuating a wedge clutch assembly for selectively engaging and disengaging an inner hub and an outer hub including the steps of: arranging first and second wedge plate segments radially between the inner and outer hubs, arranging third and fourth wedge plate segments radially between the first and second wedge plate segments and the inner hub, positioning an axially displaceable assembly to support the first, second, third and fourth wedge plate segments such that they are rotatable relative to the inner and outer hubs for a disengaged mode, and displacing the axially displaceable assembly in a first axial direction such that the first, second, third and fourth wedge plate segments are non-rotatably connected to the inner and outer hubs for an engaged mode.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 3 is a partially exploded view of the wedge plate segments and axially displaceable assembly shown in FIG. 2;

FIG. 3A is an enlarged view of the wedge plate segments from FIG. 3 with inner and outer hubs in a disengaged state;

FIG. 3B is an enlarged view of the wedge plate segments from FIG. 3 with inner and outer hubs in an engaged state;

FIG. 6C is a cross-sectional view of the wedge plate segments and axially displaceable assembly from FIG. 6A in an engaged mode;

FIG. 6D is a cross-sectional view of the wedge plate segments and axially displaceable assembly from FIG. 6B in an engaged mode;

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims. By "non-rotatably engaged" elements, we mean that: the elements are engaged so that whenever one of the elements rotate, all the elements rotate; and relative rotation between the elements is not possible. Radial and/or axial movement of non-rotatably engaged elements with respect to each other is possible, but not required. The term "thickness" means a distance between two end points of an element and includes a variable distance between two tapered edges extending away from each other.

Figure 1:
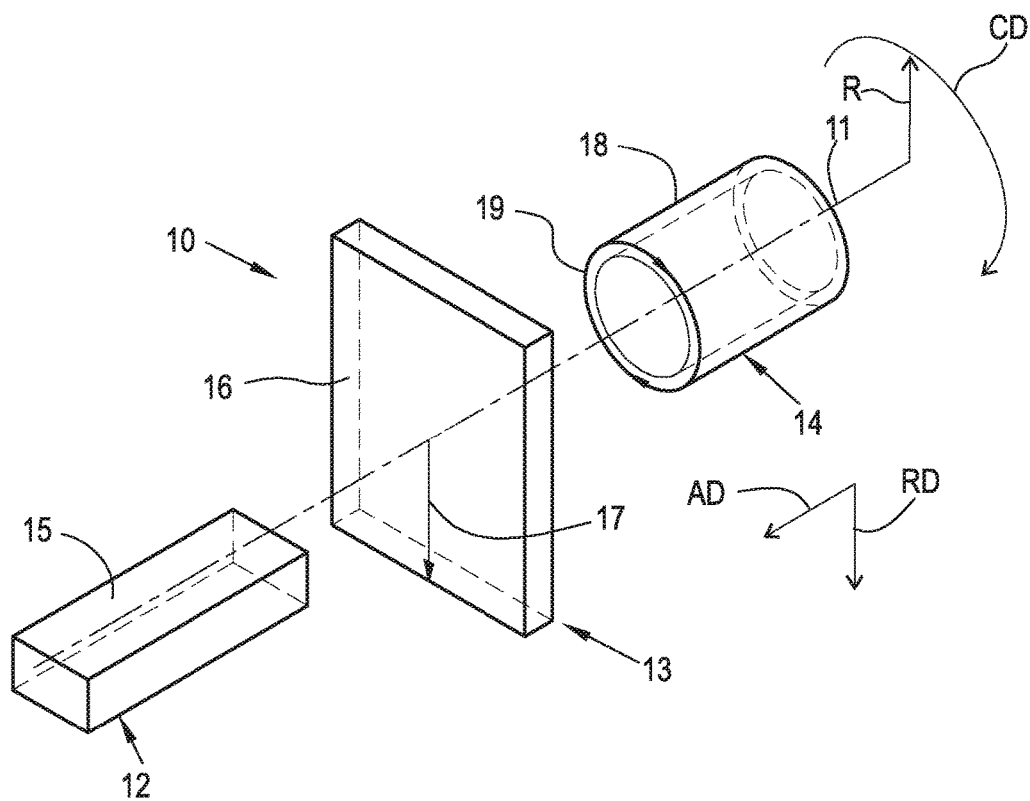
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Adverting to the figures, wedge clutch assembly 100 includes: wedge plate segments 112 and 114, wedge plate segments 116 and 118, and axially displaceable assembly 110. Wedge clutch assembly 100 or assembly 100 is arranged to selectively engage or disengage inner hub 102 and outer hub 104 (shown in FIGS. 3A and 3B). Assembly 100 is arranged radially between inner hub 102 and outer hub 104 (shown in FIGS. 3A and 3B). Wedge plate segments 112 and 114 are arranged radially between outer hub 104 and inner hub 102. Wedge plate segments 116 and 118 are arranged radially between wedge plate segments 112 and 114 and inner hub 102. Each wedge plate segment 112 includes inner circumferential surface IS1 having increasing radius R1 (shown in FIG. 6) in circumferential direction CD1. Each wedge plate segment 114 includes inner circumferential surface IS2 having decreasing radius R2 (shown in FIG. 6) in circumferential direction CD1. Each wedge plate segment 116 includes outer circumferential surface OS1 arranged to contact inner circumferential surface IS1 and each wedge plate segment 118 includes outer circumferential surface OS2 arranged to contact inner circumferential surface IS2.

Figure 2:
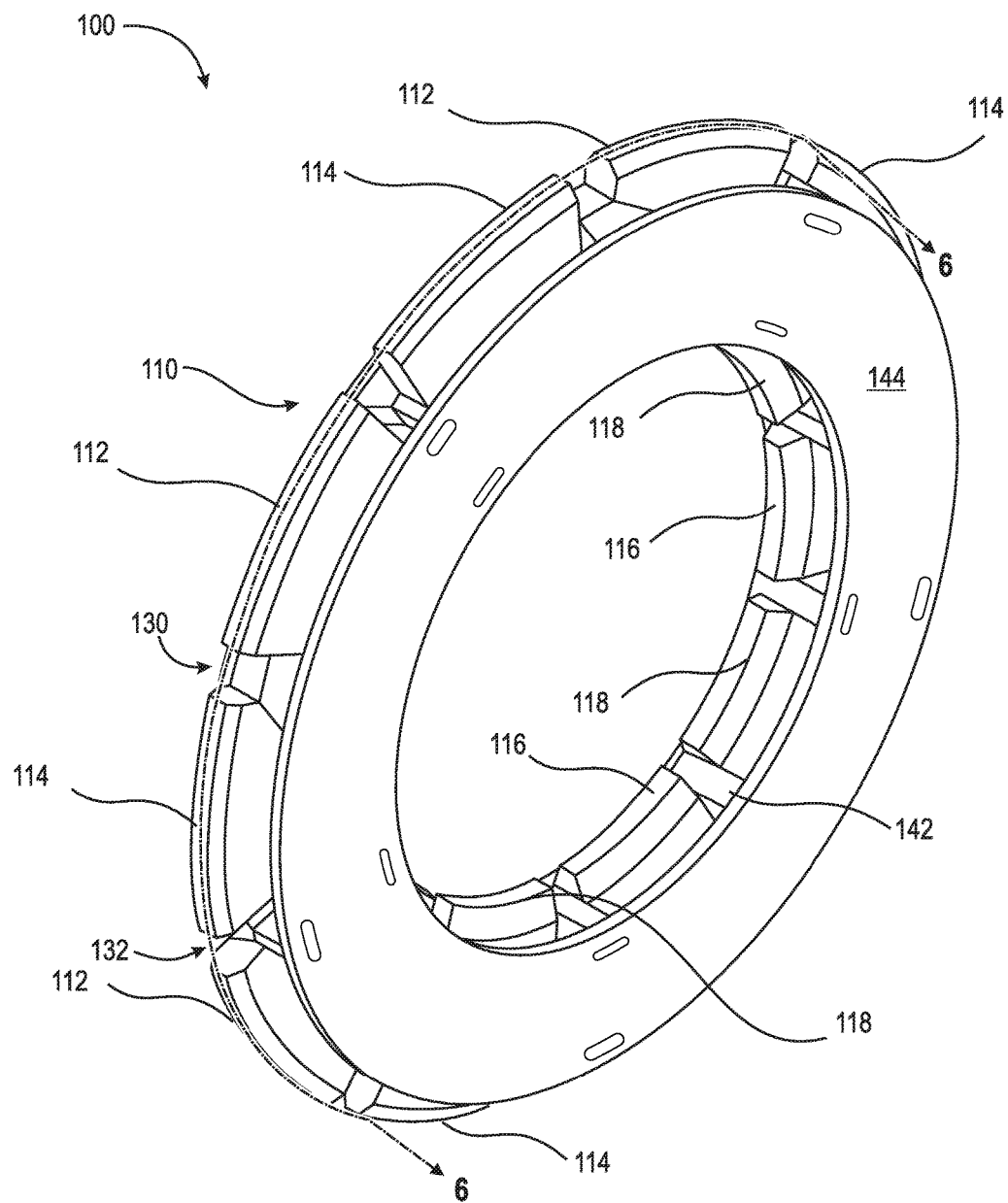
FIG. 2 is a perspective view of wedge plate segments and an axially displaceable assembly of a wedge clutch assembly according to an example embodiment.

FIG. 2 is a perspective view of wedge plate segments 112, 114, 116, 118 and axially displaceable assembly 110 of wedge clutch assembly 100 according to an example embodiment. As shown in FIG. 2, assembly 100 includes axially displaceable assembly 110 arranged to circumferentially and radially move wedge plate segments 112 and 114 relative to wedge plate segments 116 and 118 to non-rotatably connect wedge plate segments 112, 114, 116 and 118 with inner and outer hubs 102 and 104 (shown in FIGS. 3A and 3B). Axially displaceable assembly 110 supports segments 112, 114, 116 and 118 such that, in a disengaged mode, segments 112 and 114 do not engage outer hub 104 at the same time that segments 116 and 118 engage inner hub 102. In a disengaged mode, centrifugal forces cause random contact between segments 112, 114 and hub 104 or segments 116, 118 and hub 102. When axially displaceable assembly 110 is displaced in axial direction AD1 in FIG. 3, wedge clutch assembly 100 transitions from a disengaged mode, in which inner hub 102 and outer hub 104 are rotatable with respect to each other, to an engaged mode, in which inner hub 102 and outer hub 104 are non-rotatably connected with wedge clutch assembly 100. To cause an engaged mode, axially displaceable assembly 110 causes segments 112, 114 and 116, 118 to be displaced radially to frictionally engage outer hub 104 and inner hub 102, respectively, as further explained below. Axially displaceable assembly 110 is arranged to be displaced axially in axial direction AD2, where axial direction AD2 is opposite axial direction AD1, to transition from the engaged mode to the disengaged mode. Assembly 110 can be actuated by any suitable linear actuator known in the art. For example, a mechanical, hydraulic, pneumatic or electrical linear actuator can be used. Assembly 110 can also be arranged to be displaced axially in axial direction AD2 to cause the engaged mode and in axial direction AD1 to cause the disengaged mode.

FIG. 3 is a partially exploded view of wedge plate segments 112, 114, 116, 118 and axially displaceable assembly 110 shown in FIG. 2. In FIG. 3, there are five wedge plate segments 112 and five wedge plate segments 114, each of which is distinct and separately formed. Each wedge plate segment 112 is disposed circumferentially between two wedge plate segments 114. Each wedge plate segment 114 is disposed circumferentially between two wedge plate segments 112. Similarly, five wedge plate segments 116 and five wedge plate segments 118 are shown, each of which is distinct and separately formed. Each wedge plate segment 116 is disposed circumferentially between two wedge plate segments 118. Each wedge plate segment 118 is disposed circumferentially between two wedge plate segments 116. The respective discussions regarding wedge plate segments 112, 114, 116 and 118 apply to any or all segments 112, 114, 116 and 118. Although a particular number and ratio of wedge plate segments 112, 114, 116 and 118 are shown in the figures, it should be understood that other numbers and ratios of wedge plate segments 112, 114, 116 and 118 are possible. Wedge plate segments 112 and 114 are mirror images, although segments 112 and 114 need not be mirror images. Similarly, wedge plate segments 116 and 118 are mirror images, although segments 116 and 118 need not be mirror images.

In an example embodiment, axially displaceable assembly 110 is made of separately formed components which can be secured to one another. In an example embodiment, axially displaceable assembly 110 is a unitary structure. In yet another example embodiment, assembly 110 is embodied as a cage.

Axially displaceable assembly 110 includes extension members 130, 132 and 142 arranged axially relative to axis of rotation AR. Extension members 130 and 132 are engageable with segments 112 and 114 and extension members 142 are engageable with segments 116 and 118. Extension members 130 and 132 are arranged to displace segments 112 and 114 circumferentially and radially relative to segments 116 and 118, respectively, and engage outer hub 104. As segments 112 and 114 are displaced circumferentially and radially outward to engage hub 104, segments 116 and 118 are displaced radially inward to engage hub 102 due to the interaction of the alternating ramps of segments 112, 114, 116 and 118 and the presence of extensions 142. Although a particular number and configuration of extension members are shown in the figures, other numbers and configurations are possible.

In an example embodiment, axially displaceable assembly 110 further includes annular members 144 and 146 supporting extensions members 130, 132 and 142.

FIG. 3A is an enlarged view of the wedge plate segments from FIG. 3 with inner and outer hubs in a disengaged state. Inner hub 102 and/or outer hub 104 can be a shaft, a race, a sleeve or any other suitable alternative. The wedge plate segments are mounted with clearance at their radial inner and outer diameters to achieve the functionality of a disconnect clutch.

FIG. 3B is an enlarged view of the wedge plate segments from FIG. 3 with inner and outer hubs in an engaged state. In the engaged state, segments 112, 114 and 116, 118 frictionally engage outer hub 104 and inner hub 102.

Figure 4:
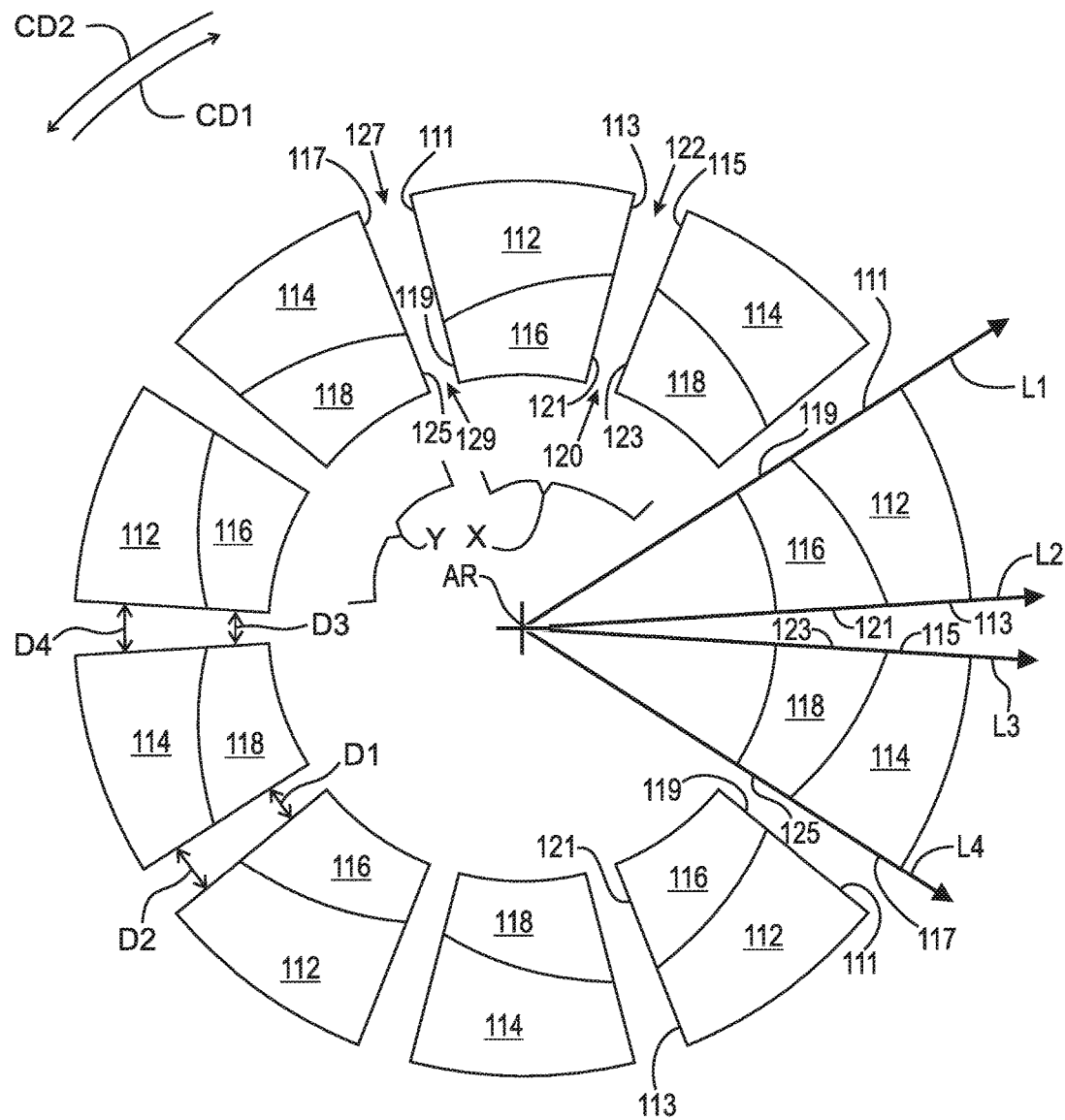
FIG. 4 is a front elevational view of the wedge plate segments shown in FIG. 2 in isolation in a disengaged mode.

FIG. 4 is a front elevational view of wedge plate segments 112, 114, 116 and 118 shown in FIG. 2 in isolation in a disengaged mode. Unit X is formed by one wedge plate segment 112, one wedge plate segment 114, one wedge plate segment 116, and one wedge plate segment 118. Wedge clutch assembly 100 further comprises unit Y, where unit Y is identical to unit X and arranged circumferentially adjacent to unit X. In FIG. 4, unit Y is arranged circumferentially adjacent in circumferential direction CD2. Although there are five units shown in the figures, additional or fewer units are possible. Wedge plate segment 112 includes radial surfaces 111 and 113. Wedge plate segment 114 includes radial surfaces 115 and 117. Wedge plate segment 116 includes radial surfaces 119 and 121. Wedge plate segment 118 includes radial surfaces 123 and 125. Radial surface 113 of segment 112 faces radial surface 115 of segment 114. Radial surface 121 of segment 116 faces radial surface 123 of segment 118. Between units X and Y, radial surface 117 of segment 114 faces radial surface 111 of segment 112 and radial surface 125 of segment 118 faces radial surface 119 of segment 116. Circumferential gap 120 is formed by radial surfaces 121 and 123. Circumferential gap 122 is formed by radial surfaces 113 and 115. Circumferential gap 122 is arranged radially outward of circumferential gap 120. Circumferential gap 127 is formed by radial surfaces 117 and 111. Circumferential gap 129 is formed by radial surfaces 125 and 119. Gap 127 is arranged radially outward of circumferential gap 129. Circumferential gaps 120, 122, 129 and 127 are respectively defined by circumferential distances D1, D2, D3, and D4 in a disengaged mode as shown in FIG. 4 where D1 is substantially equal to D3 and D2 is substantially equal to D4. Distances D2 and D4 are larger than D1 and D3, respectively.

Figure 5:
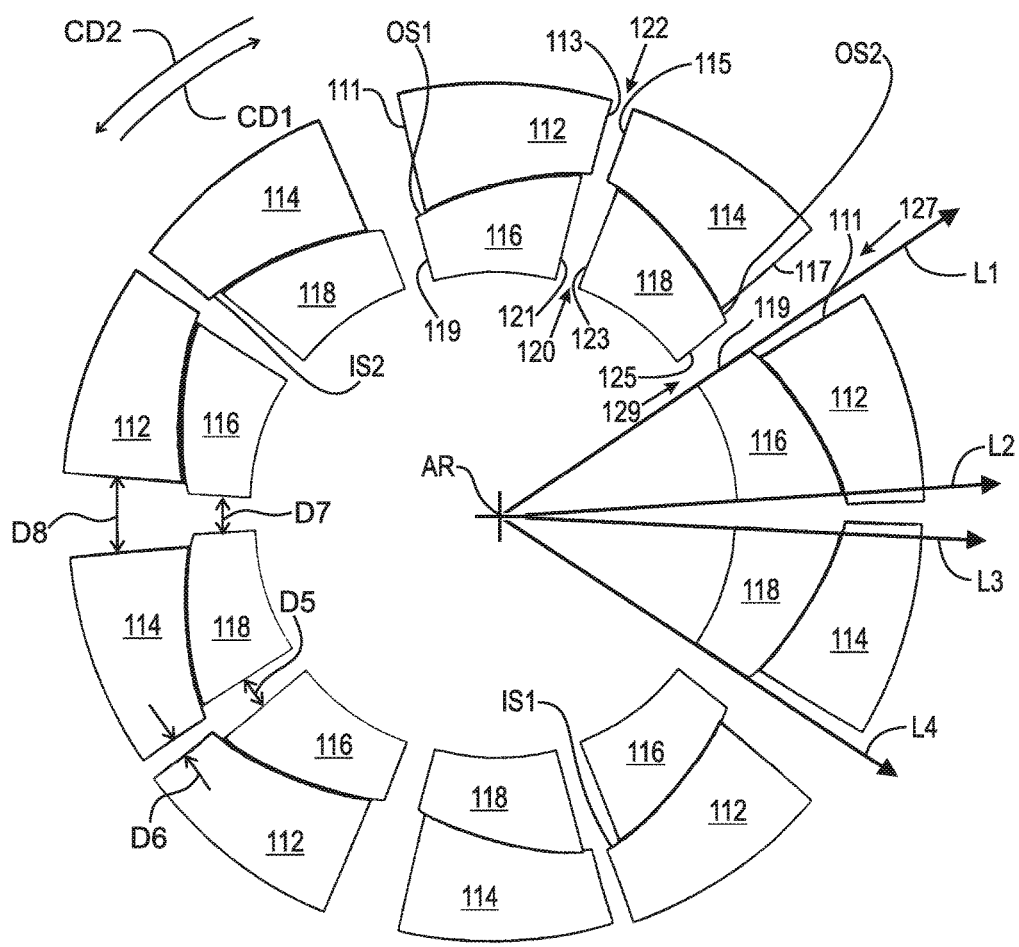
FIG. 5 is a front elevational view of the wedge plate segments shown in FIG. 4 in an engaged mode.

FIG. 5 is a front elevational view of wedge plate segments 112, 114, 116 and 118 shown in FIG. 4 in an engaged mode. In FIG. 5, circumferential gaps 120, 122, 129 and 127 are respectively defined by circumferential distances D5, D6, D7, and D8 where D1 corresponds with and substantially equals D5; D3 corresponds with and substantially equals D7; D2 corresponds with and is larger than D6; and D4 corresponds with and is smaller than D8. Distances D1/D5 and D3/D7 are substantially equal in both disengaged and engaged modes. Each circumferential gap 122 decreases in size from a disengaged mode to an engaged mode whereas each circumferential gap 127 increases in size from a disengaged mode to an engaged mode. In an engaged mode, circumferential gaps 122 are decreased in size to allow circumferential gaps 127 to increase in size.

The following discussion regarding radial surfaces 111 and 119 applies to radial surfaces 113 and 121; 115 and 123; and 117 and 125. In an example embodiment, in a disengaged mode as shown in FIG. 4, radial surfaces 111 and 119 are radially co-planar. The surfaces are radially co-planar due to imaginary line L1, starting at axis of rotation AR, passing through surfaces 111 and 119. Similarly, line L2, starting at axis of rotation AR, passes through surfaces 121 and 113. Line L3, starting at axis of rotation AR, passes through surfaces 123 and 115. Line L4, starting at axis of rotation AR passes through surfaces 125 and 117. In an engaged mode as shown in FIG. 5, due to the axial displacement of assembly 110, radial surfaces 111 and 119 are not radially co-planar. In other words, no imaginary line, starting at axis of rotation AR, passes through surfaces 111 and 119.

Figure 6:
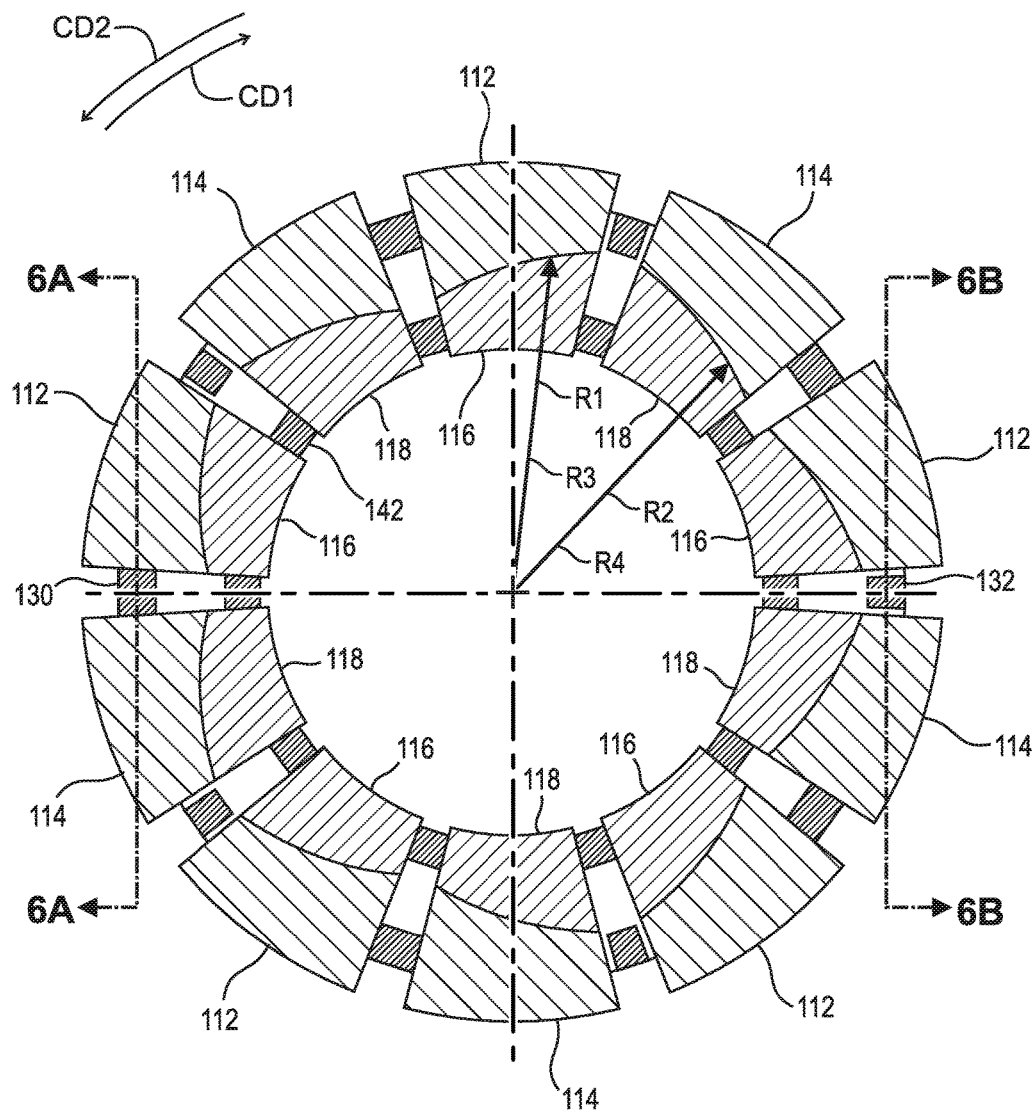
FIG. 6 is a cross-sectional view of the wedge plate segments and axially displaceable assembly taken generally along line 6-6 in FIG. 2.

FIG. 6 is a cross-sectional view of wedge plate segments 112, 114, 116, 118 and axially displaceable assembly 110 taken generally along line 6-6 in FIG. 2. As discussed above, inner circumferential surfaces IS1 and IS2 have respective increasing radius R1 and decreasing radius R2 in circumferential direction CD1. Outer circumferential surfaces OS1 and OS2 include respective increasing radius R3 and decreasing radius R4 in circumferential direction CD1. With reference to radii R1, R2, R3 and R4 shown in FIG. 6, although radii R1, R2, R3 and R4 are shown at a single location, it should be understood that each respective radius varies in circumferential directions CD1 and CD2. Extension members 130 and 132 are alternatingly arranged between wedge plate segments 112 and 114. Extension members 142 are arranged between wedge plate segments 116 and 118. Extension members 130 and 132 are partially disposed within circumferential gaps 122 and 127 in the disengaged and engaged modes in this example embodiment.

Figure 6A:
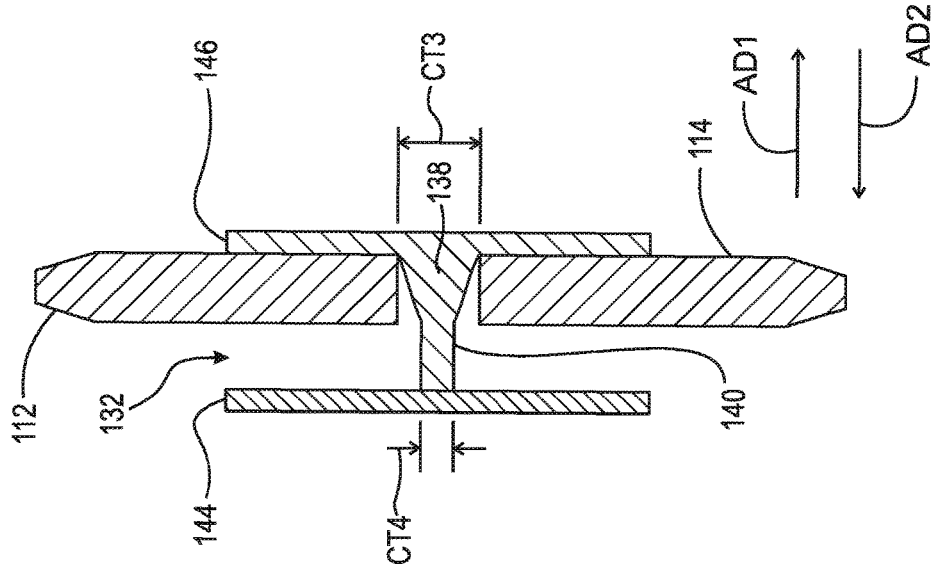
FIG. 6A is a cross-sectional view of the wedge plate segments and axially displaceable assembly taken generally along line 6A-6A in FIG. 6 in a disengaged mode.
Figure 6B:
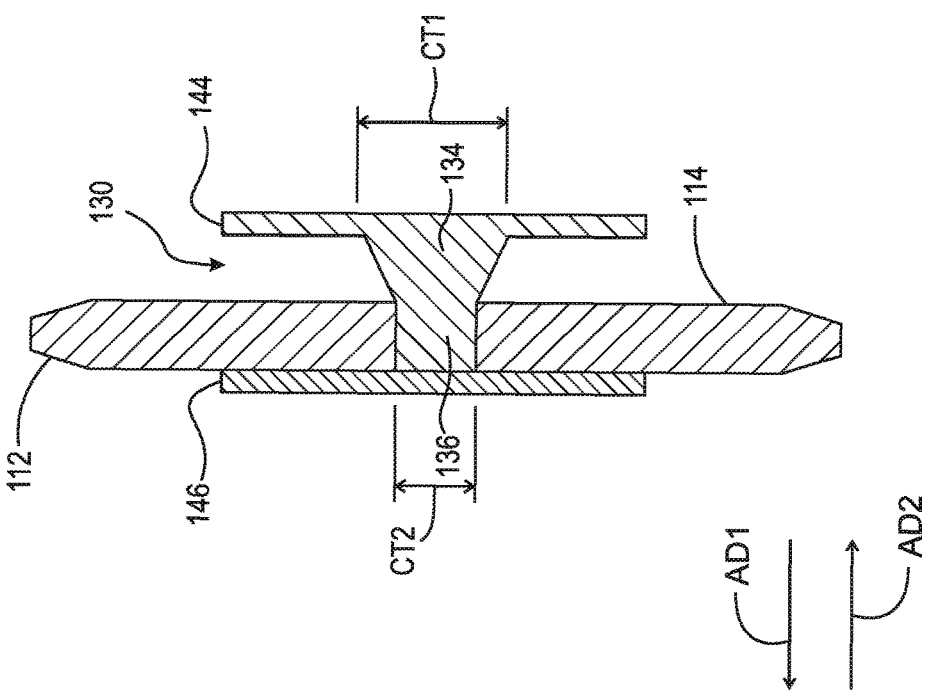
FIG. 6B is a cross-sectional view of the wedge plate segments and axially displaceable assembly taken generally along line 6B-6B in FIG. 6 in a disengaged mode.

FIG. 6A is a cross-sectional view of wedge plate segments 112, 114, 116, 118 and axially displaceable assembly 110 taken generally along line 6A-6A in FIG. 6. FIG. 6B is a cross-sectional view of wedge plate segments 112, 114, 116, 118 and axially displaceable assembly 110 taken generally along line 6B-6B in FIG. 6. Both FIGS. 6A and 6B depict the disengaged mode for assembly 100. As shown in FIG. 6A, each extension member 130 includes portion 134 having circumferential thickness CT1 and portion 136 having circumferential thickness CT2, where circumferential thickness CT2 is smaller than circumferential thickness CT1. In an example embodiment, portion 134 includes increasing circumferential thickness CT1 in axial direction AD2 where portion 134 includes an increasing taper in axial direction AD2. Portion 136 of extension member 130 is arranged in circumferential gap 122. As shown in FIG. 6B, each extension member 132 includes portion 138 having circumferential thickness CT3 and portion 140 having circumferential thickness CT4, where circumferential thickness CT4 is smaller than circumferential thickness CT3. In an example embodiment, portion 138 includes increasing circumferential thickness CT3 in axial direction AD2 where portion 138 includes an increasing taper in axial direction AD2. Portion 138 of extension member 132 is arranged in circumferential gap 127.

In FIGS. 6A and 6B depicting the disengaged mode, portions 136 and 138 are arranged to maintain circumferential distances between adjacent segments 112 and 114. Portion 136 of each extension member 130 is in contact with segments 112 and 114, portion 134 of each extension member 130 is free of contact with segments 112 and 114, portion 140 of each extension member 132 is free of contact with segments 112 and 114, portion 138 of each extension member 132 is in contact with segments 112 and 114.

When assembly 110 is displaced from the disengaged position shown in FIGS. 6A and 6B to the engaged position shown in FIGS. 6C and 6D, segments 112 and 114 are displaced circumferentially relative to wedge plate segments 116 and 118 such that, simultaneously, segments 112 and 114 slide up onto portion 134 of each extension member 130 and down onto portion 140 of each extension member 132.

Figure 7:
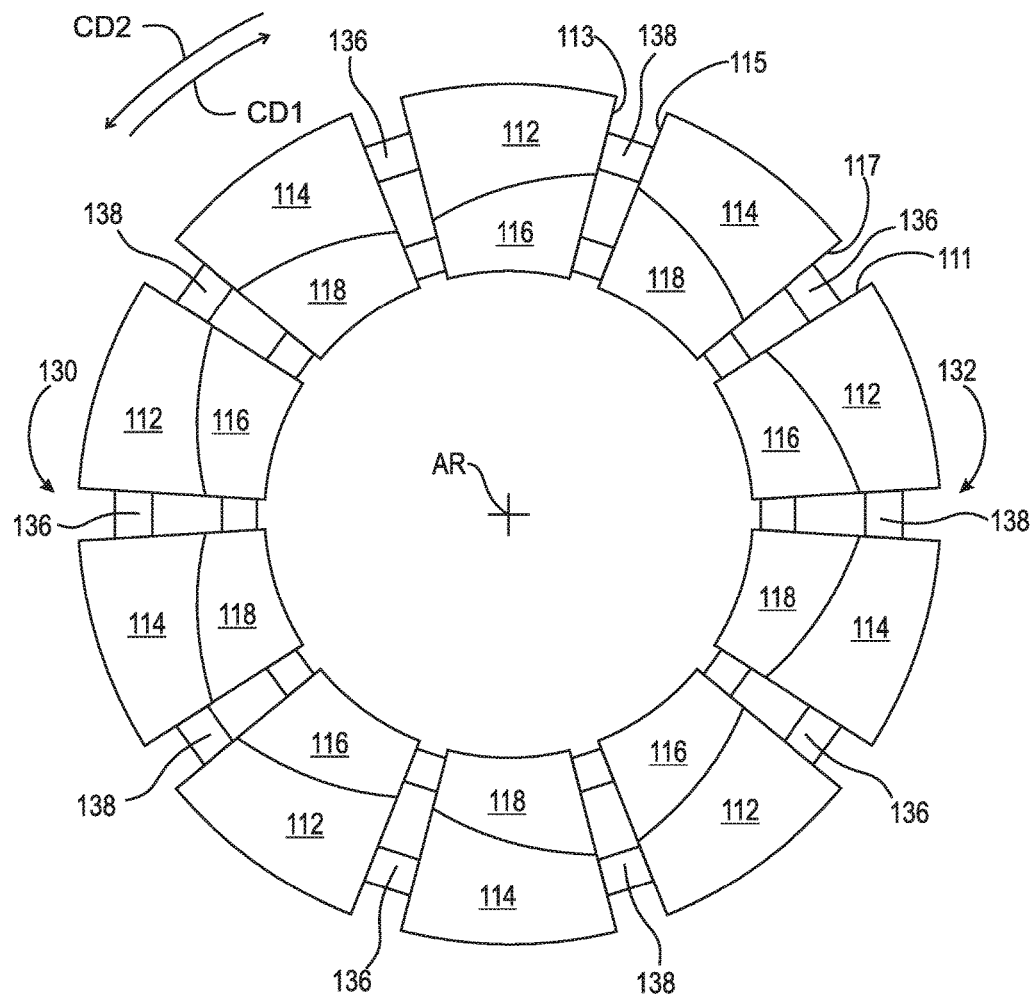
FIG. 7 is a front elevational view of the wedge plate segments and the extension members of the axially displaceable assembly shown in FIG. 2 in isolation in a disengaged mode.

FIG. 7 is a front elevational view of the wedge plate segments and the extension members of the axially displaceable assembly shown in FIG. 2 in isolation in a disengaged mode. In FIG. 7, each portion 136 of each extension member 130 is disposed between respective surfaces 117 and 111. Each portion 138 of each extension member 132 is disposed between respective surfaces 113 and 115.

Figure 8:
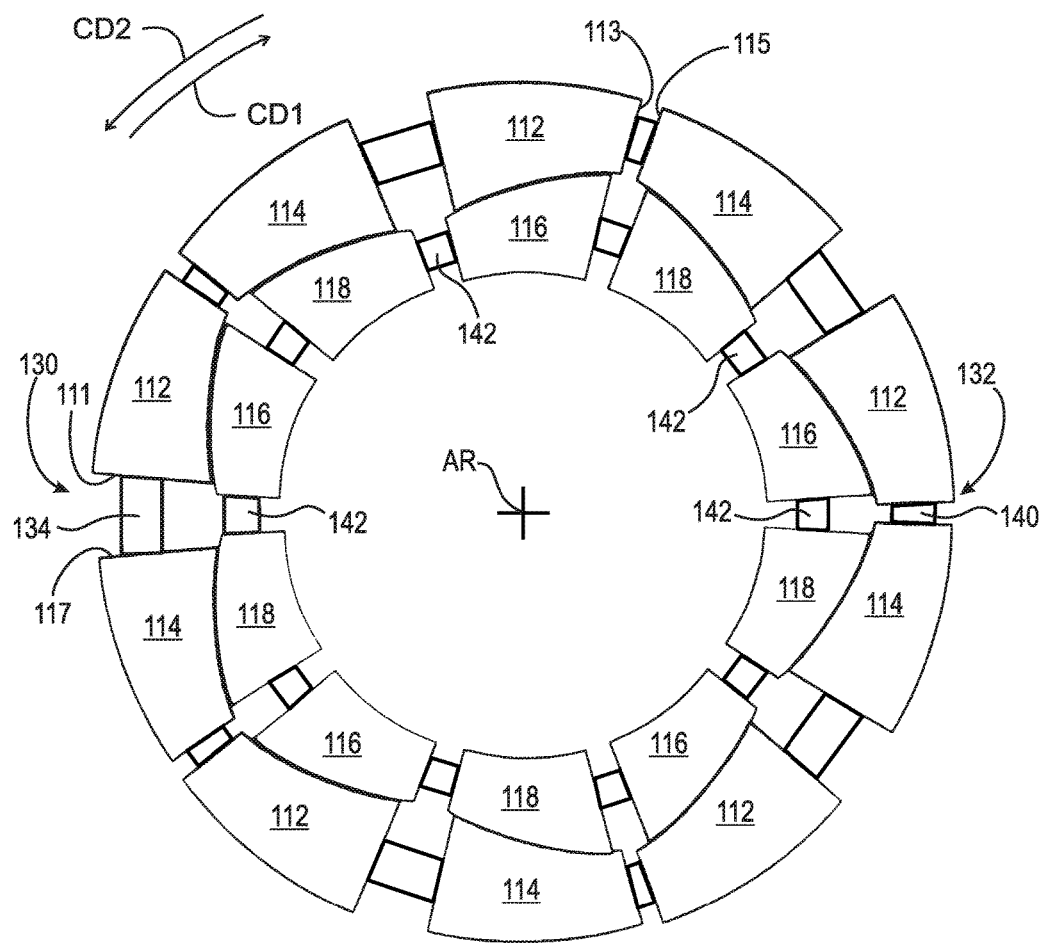
FIG. 8 is a front elevational view of the wedge plate segments and the extension members of the axially displaceable assembly shown in FIG. 7 in an engaged mode.

FIG. 8 shows an engaged mode where each portion 134 of each extension member 130 is disposed between respective surfaces 111 and 117 and each portion 140 of each extension member 132 is disposed between respective surfaces 113 and 115. In the engaged mode shown in FIG. 8, portion 134 of each extension member 130 is in contact with segments 112 and 114, portion 136 of each extension member 130 is free of contact with segments 112 and 114, portion 138 of each extension member 132 is free of contact with segments 112 and 114, and portion 140 of each extension member 132 is in contact with segments 112 and 114. Due to the axial displacement of assembly 110, each radial surface 111 is displaced in circumferential direction CD1 and each surface 117 is displaced in circumferential direction CD2, further away from each surface 111. Simultaneously, each surface 113 is displaced in circumferential direction CD1 and each surface 115 is displaced in circumferential direction CD2, closer to each surface 113. Due to sloping circumferential surfaces IS1, IS2, OS1 and OS2, the circumferential displacement is accompanied by a radial displacement such that segments 112 and 114 frictionally engage outer hub 104 and segments 116 and 118 frictionally engage inner hub 102.

Figure 9:
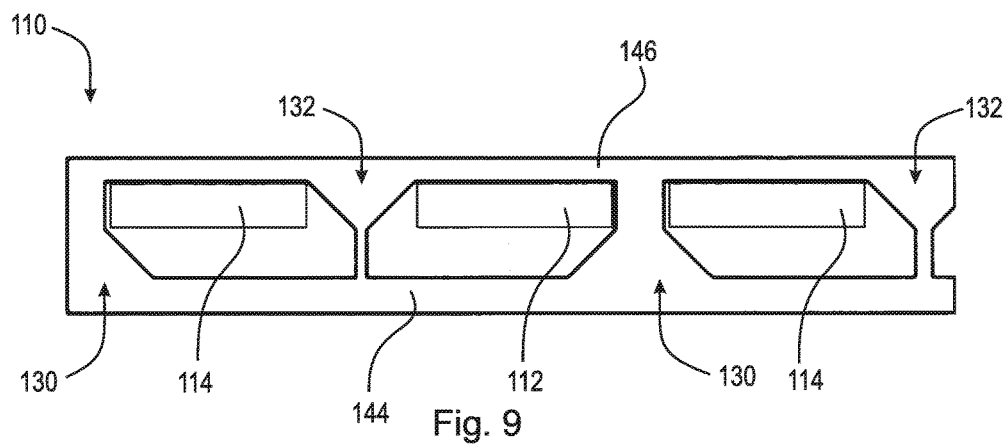
FIG. 9 is a top plan view of the wedge plate segments and the axially displaceable assembly shown in FIG. 2 in a disengaged mode.

FIG. 9 is a top plan view of the wedge plate segments and the axially displaceable assembly shown in FIG. 2 in a disengaged mode. Wedge plate segments 112 and 114 are arranged alongside annular member 146.

Figure 10:
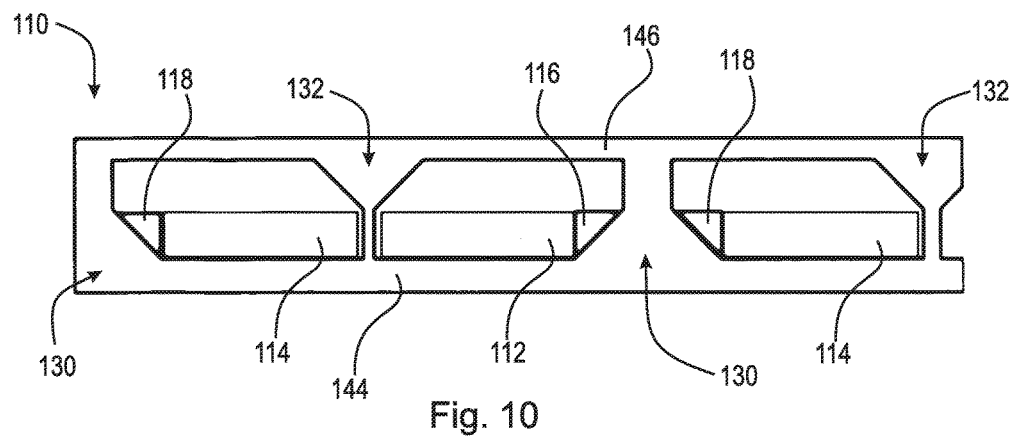
FIG. 10 is a top plan view of the wedge plate segments and the axially displaceable assembly shown in FIG. 9 in an engaged mode.

FIG. 10 is a top plan view of the wedge plate segments and the axially displaceable assembly shown in FIG. 9 in an engaged mode. Wedge plate segments 112 and 114 are arranged alongside annular member 144. Due to the displacement of segments 112 and segments 114, portions of segments 116 and 118 are visible.

Figure 11:
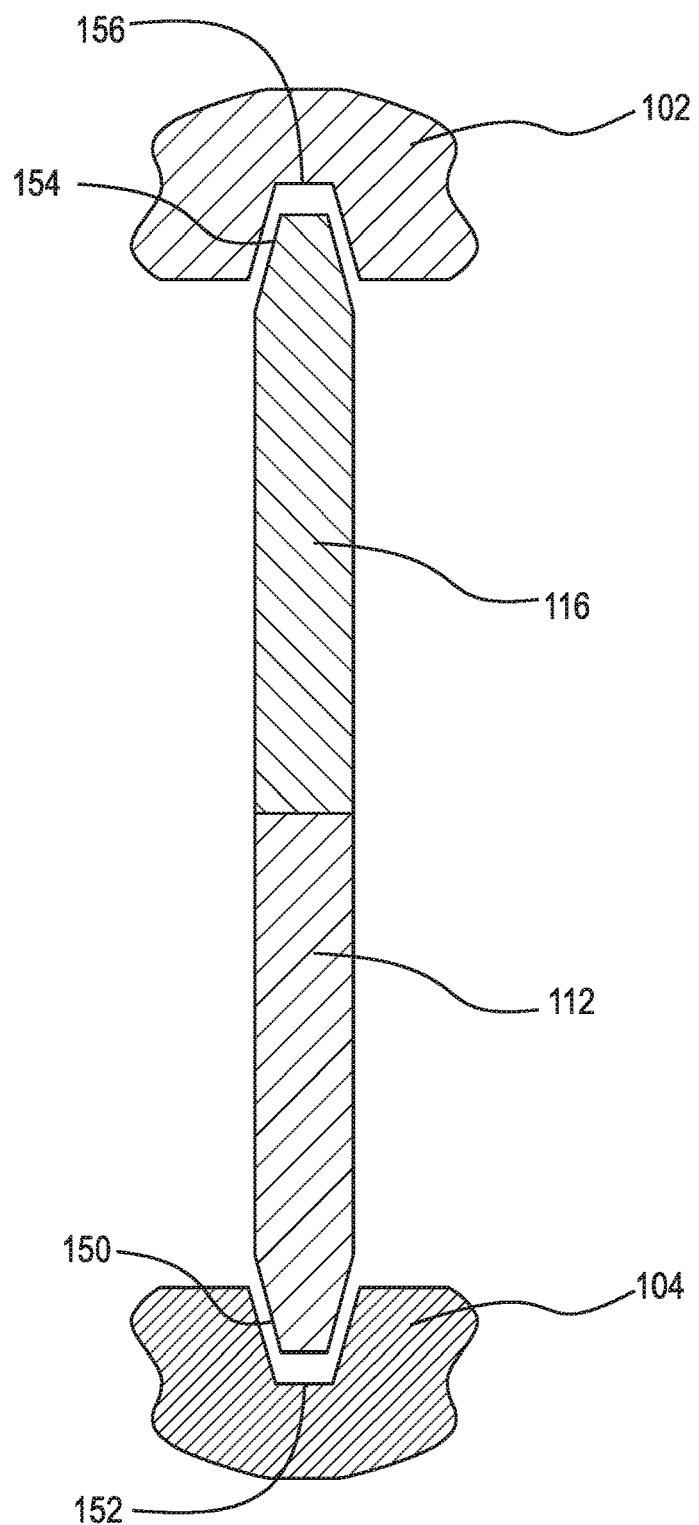
FIG. 11 is a cross-sectional view of the wedge plate segments taken generally along line 11-11 in FIG. 3A.

FIG. 11 is a cross-sectional view of wedge plate segments 112 and 116 taken generally along line 11-11 in FIG. 3A. In the disengaged mode shown, there is clearance between segment 116 relative to inner hub 102 and segment 112 relative to outer hub 104. Segment 112 includes outer circumferential surface 150 arranged to frictionally engage inner circumferential groove 152 of outer hub 104. Wedge plate segment 116 includes inner circumferential surface 154 arranged to frictionally engage outer circumferential groove 156 of inner hub 102.

Figure 12:
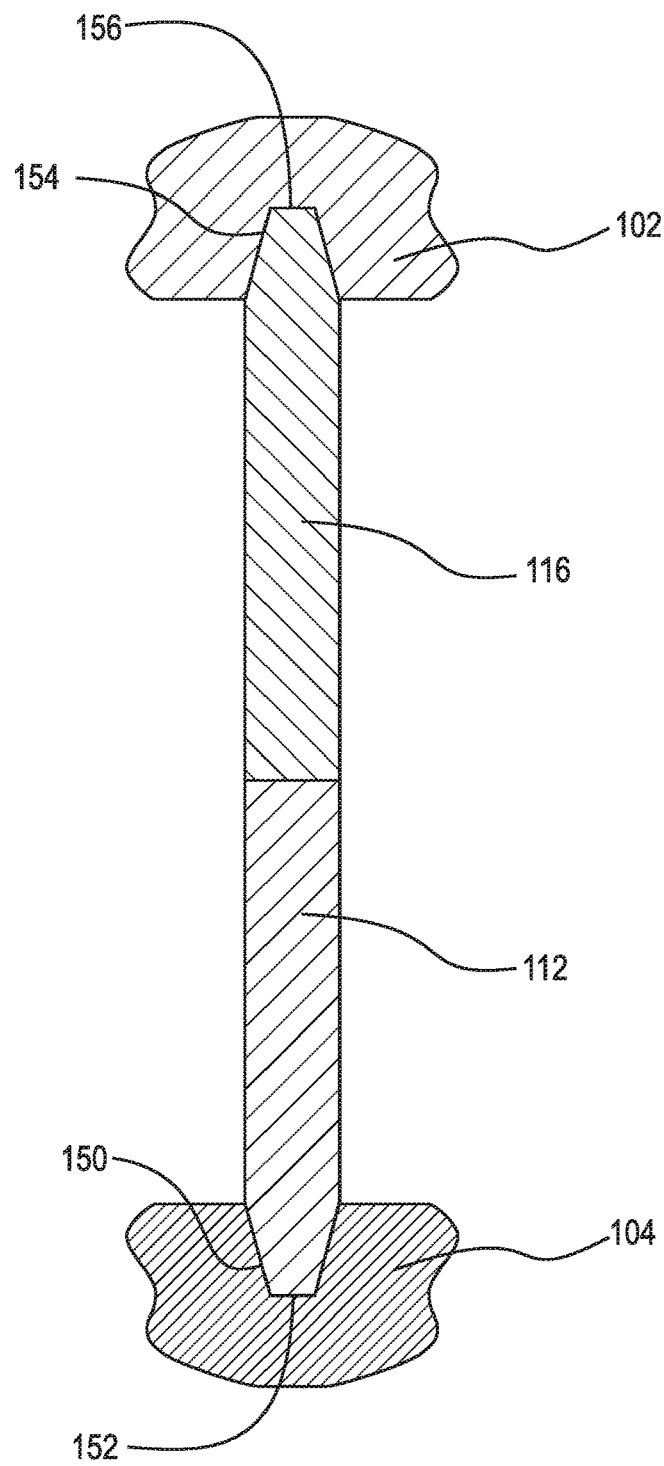
FIG. 12 is a cross-sectional view of the wedge plate segments taken generally along line 12-12 in FIG. 3B.

FIG. 12 is a cross-sectional view of wedge plate segments 112 and 116 taken generally along line 12-12 in FIG. 3B. In the engaged mode illustrated, segment 116 frictionally engages inner hub 102 and segment 112 frictionally engages outer hub 104. Similarly, segments 114 and 118 include respective outer and inner circumferential surfaces to engage the outer and inner hubs.

Figure 13:
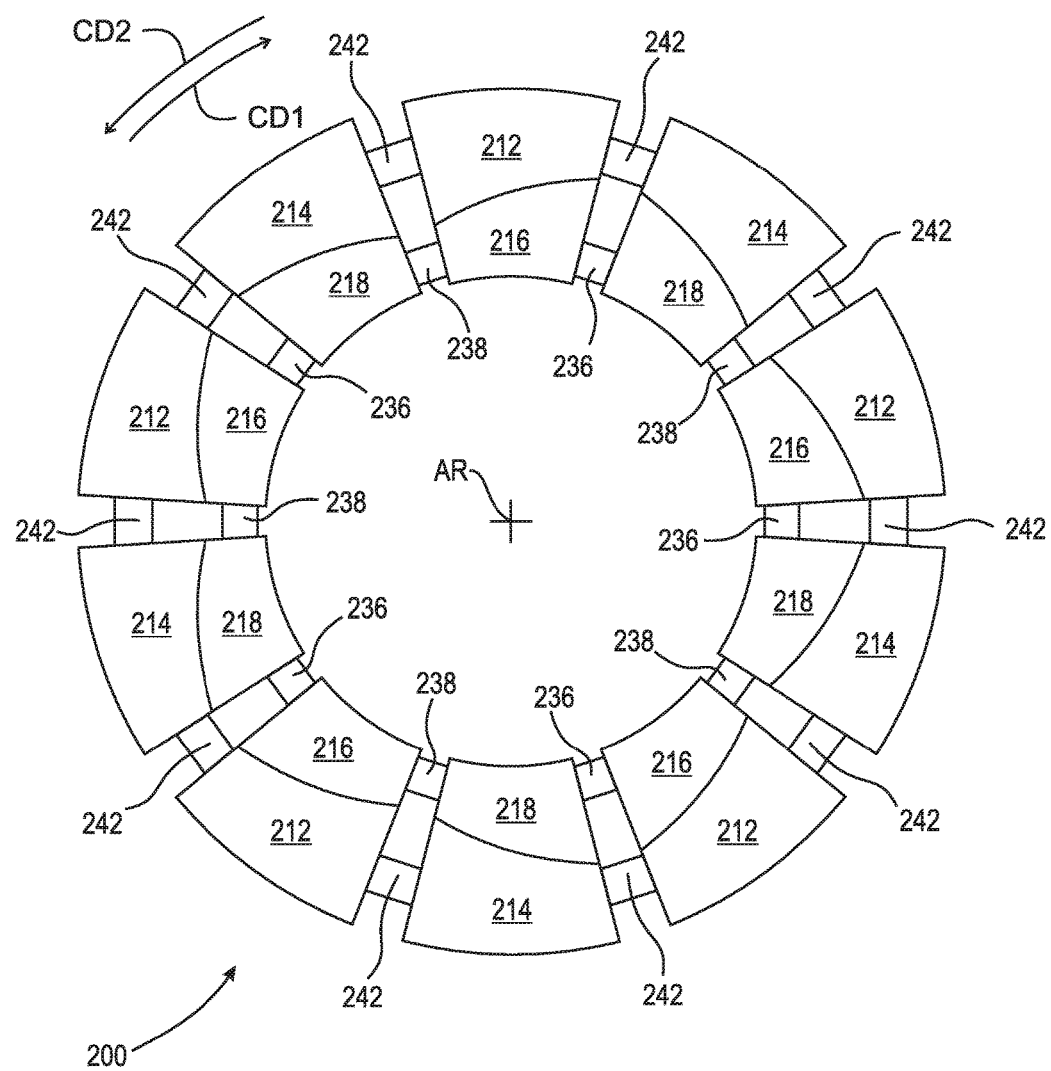
FIG. 13 is a front elevational view of wedge plate segments and an axially displaceable assembly of a wedge clutch assembly according to an example embodiment where the wedge plate segments and axially displaceable assembly are shown in isolation in a disengaged mode.

FIG. 13 shows a front elevational view of wedge plate segments and an axially displaceable assembly of a wedge clutch assembly according to an example embodiment where the wedge plate segments and axially displaceable assembly are shown in isolation in a disengaged mode.

Figure 14:
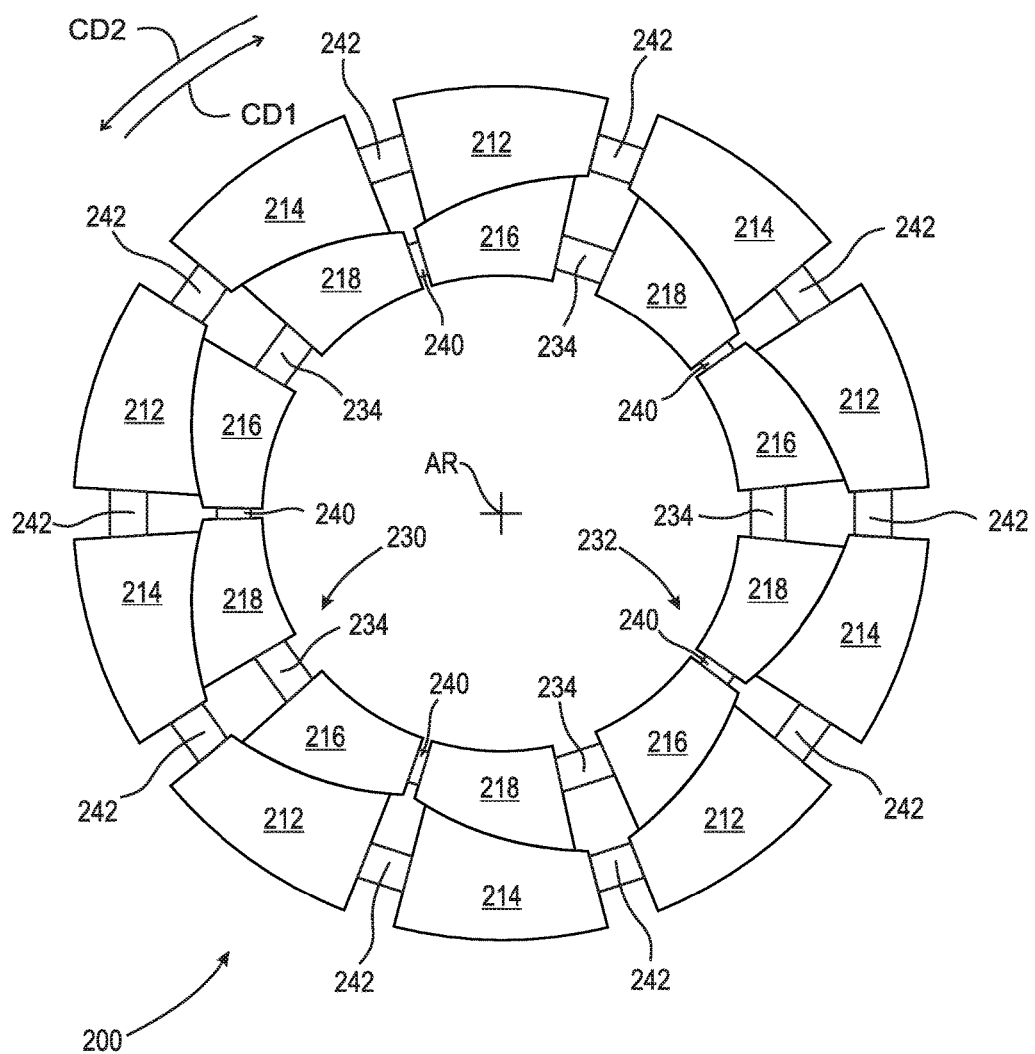
FIG. 14 is a front elevational view of the wedge plate segments and axially displaceable assembly shown in FIG. 13 in isolation in an engaged mode.

FIG. 14 shows a front elevational view of the wedge plate segments and axially displaceable assembly shown in FIG. 13 in isolation in an engaged mode. The discussion above pertaining to assembly 100 is applicable to assembly 200 except as noted. The axially displaceable assembly 110 supports segments 212, 214, 216 and 218. The axially displaceable assembly includes extension members 230, 232 and 242 which are equivalent to extension members 130, 132 and 142. Each extension member 230 includes portion 234 having a circumferential thickness and portion 236 having a circumferential thickness which is smaller than the circumferential thickness of portion 234. Each extension member 232 includes portion 238 having a circumferential thickness and portion 240 having a circumferential thickness which is smaller than the thickness of portion 238. Extension members 230 and 232 are engageable with wedge plate segments 216 and 218 to displace segments 216 and 218 circumferentially and radially inward relative to segments 212 and 214 to engage inner hub 102. Extensions 242 maintain the circumferential positioning of segments 212 and 214 in the disengaged and engaged modes. As segments 216 and 218 slide along the ramps of segments 212 and 214, due to extensions 242 segments 212 and 214 are displaced radially outward to frictionally engage the outer hub.

Figure 15:
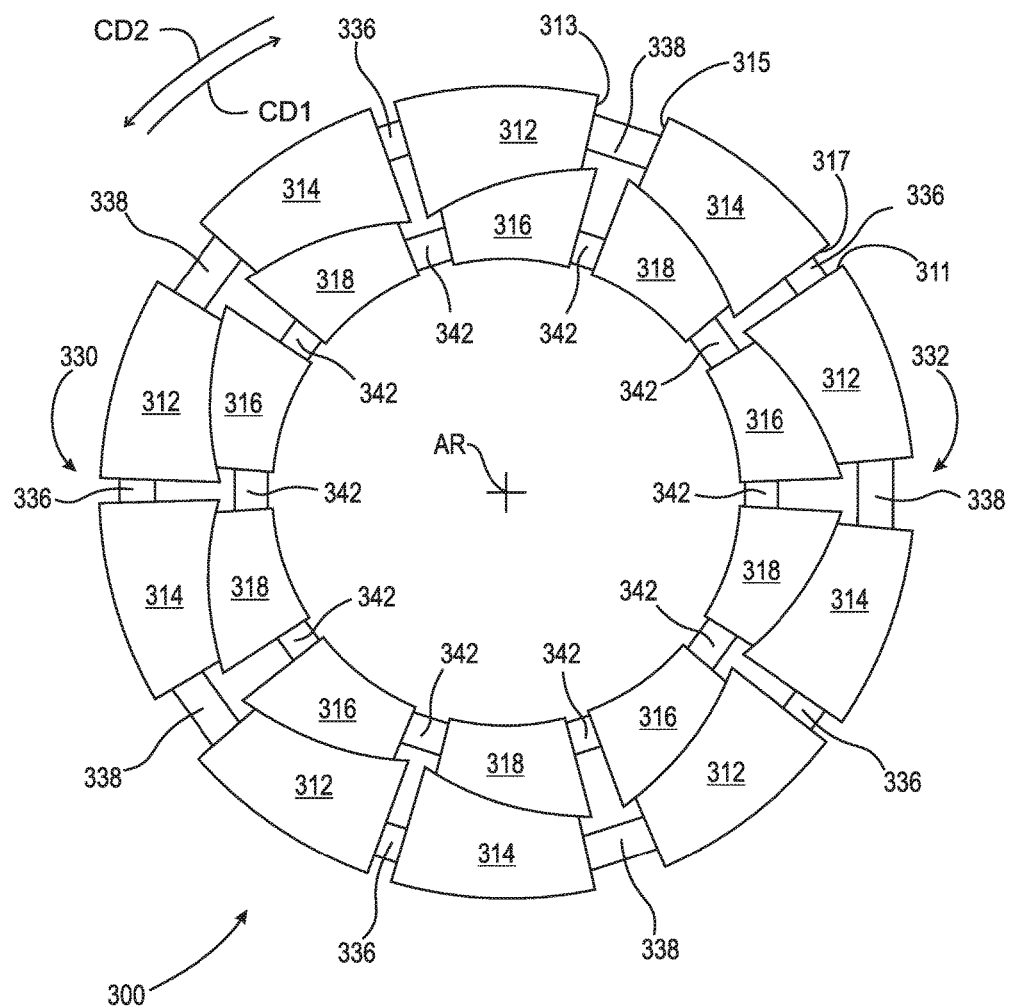
FIG. 15 is a front elevational view of wedge plate segments and an axially displaceable assembly of a wedge clutch assembly according to an example embodiment where the wedge plate segments and axially displaceable assembly are shown in isolation in a disengaged mode; and, FIG. 16 is a front elevational view of the wedge plate segments and axially displaceable assembly shown in FIG. 15 in isolation in an engaged mode.

FIG. 15 is a front elevational view of wedge plate segments and an axially displaceable assembly of a wedge clutch assembly according to an example embodiment where the wedge plate segments and axially displaceable assembly are shown in isolation in a disengaged mode.

Figure 16:
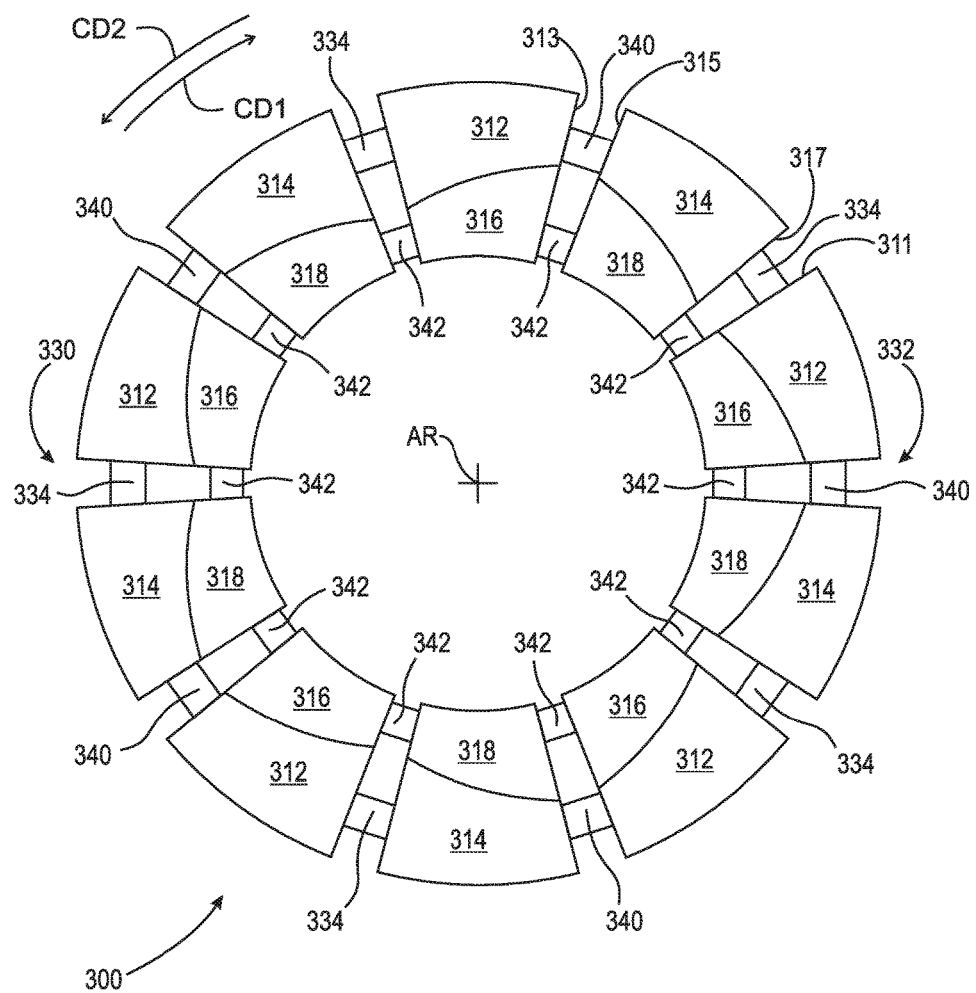

FIG. 16 is a front elevational view of the wedge plate segments and axially displaceable assembly shown in FIG. 15 in isolation in an engaged mode. The discussions pertaining to assemblies 100 and 200 are applicable except as noted. The axially displaceable assembly of clutch 300 supports wedge segments 312, 314, 316 and 318. The axially displaceable assembly includes extensions members 330, 332 and 342. In the disengaged mode shown in FIG. 15, segments 312 are misaligned radially relative to segment 316 and segments 314 are misaligned radially relative to segment 318. In the engaged mode shown in FIG. 16, segments 312 are aligned radially relative to segments 316 and segments 314 are aligned radially relative to segments 318. Each extension member 330 includes portion 334 having a circumferential thickness and portion 336 having a circumferential thickness which is smaller than the circumferential thickness of portion 334. Each extension member 332 includes portion 338 having a circumferential thickness and portion 340 having a circumferential thickness which is smaller than the thickness of portion 338. In the disengaged mode shown in FIG. 15, portions 336 and 338 are in contact with segments 312 and 314. In the engaged mode shown in FIG. 16, portions 334 and 340 are in contact with segments 312 and 314.

Extensions members 330 and 332 are engageable with segments 312 and 314 to displace segments 312 and 314 radially outward to frictionally engage the outer hub. As segments 312 and 314 slide up the ramps of segments 316 and 318, due to extensions 342 segments 316 and 318 are displaced radially inward to frictionally engage the inner hub. Although wedge segments 316 and 318 are maintained circumferentially in the disengaged and engaged modes by extensions 342 in the embodiment depicted in FIGS. 15 and 16, it should be understood that in an example embodiment, wedge segments 312 and 314 are maintained circumferentially in the disengaged and engaged modes by extensions 342 and segments 316 and 318 are displaced circumferentially in the engaged mode.

In an example embodiment, segments 112, 212, or 312 are misaligned radially relative to segment 116, 216 or 316, respectively, and segments 114, 214, or 314 are misaligned radially relative to segments 118, 218 or 318, respectively.

In an example embodiment, circumferential direction CD1 is clockwise and circumferential direction CD2 is counter-clockwise. In an example embodiment, circumferential direction CD1 is counter-clockwise and circumferential direction CD2 is clockwise.

The following describes an example method of actuating wedge clutches 100, 200 and 300. Although the method is presented as a sequence of steps for clarity, no order should be inferred unless explicitly stated. In order to actuate wedge clutch assembly 100, 200 and 300, a first step includes arranging first and second wedge plate segments radially between an inner hub and an outer hub. A second step includes arranging third and fourth wedge plate segments radially between the first and second wedge plate segments and the inner hub. A third step includes positioning an axially displaceable assembly to support the first, second, third and fourth wedge plate segments such that they are rotatable relative to the inner and outer hubs for the disengaged mode. The first, second and third steps are interchangeable.

After the first, second and third steps, a fourth step includes displacing the axially displaceable assembly in a first axial direction such that the first, second, third and fourth wedge plate segments are non-rotatably connected to the inner and outer hubs for the engaged mode.

In an example embodiment, the step of arranging the third and fourth wedge plate segments includes arranging a first outer circumferential surface of the third wedge plate segment to contact a first inner circumferential surface of the first wedge plate segment and arranging a second outer circumferential surface of the fourth wedge plate segment to contact a second inner circumferential surface of the second wedge plate segment.

In an example embodiment, the step of positioning the axially displaceable assembly includes positioning first extension members between the first and second wedge plate segments and positioning second extension members between the third and fourth wedge plate segments.

In an example embodiment, the step of displacing the axially displaceable assembly includes displacing the first wedge plate segments a first circumferential direction and the second wedge plate segments in a second circumferential direction or displacing the third wedge plate segments in a first circumferential direction and the fourth wedge plate segments in a second circumferential direction.

Advantageously, wedge clutch assemblies 100, 200 and 300 prevent unintentional locking in the disengaged state due to presence of the axially displaceable assemblies. Wedge clutch assemblies 100, 200 and 300 can be engaged in circumferential direction CD1 or circumferential direction CD2. The axially displaceable assemblies displace wedge plate segments circumferentially and radially to engage the outer hub and inner hub due to the orientation of the wedge segment pairs. Wedge clutch assemblies 100, 200 and 300 are easier to fabricate than typical wedge clutch designs having a tapered inner hub. The wedge segments can be made of powdered metal or any suitable alternative. The axially displaceable assemblies can be made of plastic, powdered metal, or any suitable alternative. Wedge clutch assemblies 100, 200 and 300 are bi-directional.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE VARIABLES 10 cylindrical coordinate system
11 longitudinal axis
12 object
13 object
14 object
15 surface
16 surface
17 radius
18 surface
19 circumference
AD axial direction
AD1 axial direction
AD2 axial direction
RD radial direction
CD circumferential direction
CD1 circumferential direction
CD2 circumferential direction
R radius
AR axis of rotation
100 wedge clutch assembly
102 inner hub
104 outer hub
110 axially displaceable assembly
111 radial surface
112 wedge plate segment
113 radial surface
114 wedge plate segment
115 radial surface
116 wedge plate segment
117 radial surface
118 wedge plate segment
119 radial surface
120 circumferential gap
121 radial surface
122 circumferential gap
123 radial surface
125 radial surface
127 circumferential gap
129 circumferential gap
IS1 inner circumferential surface
IS2 inner circumferential surface
OS1 outer circumferential surface
OS2 outer circumferential surface
R1 radius
R2 radius
R3 radius
R4 radius
130 extension member
132 extension member
134 portion
136 portion
CT1 circumferential thickness
CT2 circumferential thickness
CT3 circumferential thickness
CT4 circumferential thickness
138 portion
140 portion
142 extension member
144 annular member
146 annular member
X unit
Y unit
D1 distance
D2 distance
D3 distance
D4 distance
D5 distance
D6 distance
D7 distance
D8 distance
L1 line
L2 line
150 outer circumferential surface
152 inner circumferential groove
154 inner circumferential surface
156 outer circumferential groove
200 wedge clutch assembly
212 wedge plate segment
214 wedge plate segment
216 wedge plate segment
218 wedge plate segment
230 extension member
232 extension member
234 portion
236 portion
238 portion
240 portion
242 extension member
300 wedge clutch assembly
312 wedge plate segment
314 wedge plate segment
316 wedge plate segment
318 wedge plate segment
330 extension member
332 extension member
334 portion
336 portion
338 portion
340 portion
342 extension member

What is claimed is:

1. A wedge clutch assembly for selectively engaging and disengaging an inner and outer hub, comprising:
first and second wedge plate segments arranged radially between the inner and outer hubs;
third and fourth wedge plate segments arranged radially between the first and second wedge plate segments and the inner hub; and,
an axially displaceable assembly arranged to non-rotatably connect the first, second, third, and fourth wedge plate segments with the inner and outer hubs, the axially displaceable assembly comprising:
first extension members contacting the first and second wedge plate segments; and,
second extension members contacting the third and fourth wedge plate segments, the second extension members being different than the first extension members;
wherein the first wedge plate segment includes a first inner circumferential surface having an increasing radius in a first circumferential direction and the second wedge plate segment includes a second inner circumferential surface having a decreasing radius in the first circumferential direction, and the third wedge plate segment includes a first outer circumferential surface in contact with the first inner circumferential surface and the fourth wedge plate segment includes a second outer circumferential surface in contact with the second inner circumferential surface.

2. The wedge clutch assembly recited in claim 1, wherein at least one extension member of the first extension members includes first and second portions having first and second circumferential thicknesses, respectively, the second circumferential thickness being smaller than the first circumferential thickness.

3. The wedge clutch assembly recited in claim 2, wherein another extension of the first extension members includes third and fourth portions having third and fourth circumferential thicknesses, respectively, the fourth circumferential thickness being smaller than the third circumferential thickness, the third circumferential thickness being smaller than the first circumferential thickness and the fourth circumferential thickness being smaller than the second circumferential thickness.

4. The wedge clutch assembly recited in claim 1, wherein at least one extension member of the second extension members includes first and second portions having first and second circumferential thicknesses, respectively, the second circumferential thickness being smaller than the first circumferential thickness.

5. The wedge clutch assembly recited in claim 4, wherein another extension of the second extension members includes third and fourth portions having third and fourth circumferential thicknesses, respectively, the fourth circumferential thickness being smaller than the third circumferential thickness, the third circumferential thickness being smaller than the first circumferential thickness and the fourth circumferential thickness being smaller than the second circumferential thickness.

6. The wedge clutch assembly recited in claim 1, further comprising first and second annular members connected to the first and second extension members.

7. The wedge clutch assembly recited in claim 1, wherein the first and second extension members move the first and second wedge plate segments relative to the third and fourth wedge plate segments circumferentially and radially to transition between disengaged and engaged modes.

8. A wedge clutch assembly for selectively engaging and disengaging an inner and outer hub, comprising:
   first and second wedge plate segments arranged radially between the inner and outer hubs;
   third and fourth wedge plate segments arranged radially between the first and second wedge plate segments and the inner hub; and,
   an axially displaceable assembly arranged to non-rotatably connect the first, second, third, and fourth wedge plate segments with the inner and outer hubs, the axially displaceable assembly comprising:
      first extension members contacting the first and second wedge plate segments; and
      second extension members contacting the third and fourth wedge plate segments, the second extension members being different than the first extension members;
   wherein the first and second extension members move the first and second wedge plate segments relative to the third and fourth wedge plate segments circumferentially and radially to transition between disengaged and engaged modes.

9. The wedge clutch assembly as recited in claim 8, wherein the first wedge plate segment includes a first inner circumferential surface having an increasing radius in a first circumferential direction and the second wedge plate segment includes a second inner circumferential surface having a decreasing radius in the first circumferential direction, and the third wedge plate segment includes a first outer circumferential surface in contact with the first inner circumferential surface and the fourth wedge plate segment includes a second outer circumferential surface in contact with the second inner circumferential surface.

10. The wedge clutch assembly recited in claim 8, wherein at least one extension member of the first extension members includes first and second portions having first and second circumferential thicknesses, respectively, the second circumferential thickness being smaller than the first circumferential thickness.

11. The wedge clutch assembly recited in claim 10, wherein another extension of the first extension members includes third and fourth portions having third and fourth circumferential thicknesses, respectively, the fourth circumferential thickness being smaller than the third circumferential thickness, the third circumferential thickness being smaller than the first circumferential thickness and the fourth circumferential thickness being smaller than the second circumferential thickness.

12. The wedge clutch assembly recited in claim 8, wherein at least one extension member of the second extension members includes first and second portions having first and second circumferential thicknesses, respectively, the second circumferential thickness being smaller than the first circumferential thickness.

13. The wedge clutch assembly recited in claim 12, wherein another extension of the second extension members includes third and fourth portions having third and fourth circumferential thicknesses, respectively, the fourth circumferential thickness being smaller than the third circumferential thickness, the third circumferential thickness being smaller than the first circumferential thickness and the fourth circumferential thickness being smaller than the second circumferential thickness.

14. The wedge clutch assembly recited in claim 8, further comprising first and second annular members connected to the first and second extension members.

* * * * *